US011216910B2

(12) United States Patent
Liu et al.

(10) Patent No.: US 11,216,910 B2
(45) Date of Patent: Jan. 4, 2022

(54) IMAGE PROCESSING SYSTEM, IMAGE PROCESSING METHOD AND DISPLAY DEVICE (71) Applicant: BOE TECHNOLOGY GROUP CO., LTD., Beijing (CN)

(72) Inventors: Hanwen Liu, Beijing (CN); Pablo Navarrete Michelini, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 129 days.

(21) Appl. No.: 16/073,712

(22) PCT Filed: Dec. 19, 2017

(86) PCT No.: PCT/CN2017/117116
§ 371 (c)(1),
(2) Date: Jul. 27, 2018

(87) PCT Pub. No.: WO2018/205627
PCT Pub. Date: Nov. 15, 2018

(65) Prior Publication Data
US 2021/0209730 A1 Jul. 8, 2021

(30) Foreign Application Priority Data
May 8, 2017 (CN) .......................... 201710324036.9

(51) Int. Cl.
G06T 3/40 (2006.01)
G06N 3/04 (2006.01)
(Continued)

(52) U.S. Cl.
CPC ............ G06T 3/4046 (2013.01); G06N 3/04 (2013.01); G06N 3/08 (2013.01); G06T 3/4007 (2013.01);
(Continued)

(58) Field of Classification Search
None
See application file for complete search history.

(56) References Cited

U.S. PATENT DOCUMENTS

2017/0220000 A1* 8/2017 Ozcan ................. G03H 1/0866
2018/0197037 A1   7/2018 Navarrete Michelini et al.
(Continued)

FOREIGN PATENT DOCUMENTS

CN       105120130 A    12/2015
CN       204948182 U     1/2016
(Continued)

OTHER PUBLICATIONS

Hang Zhao, Orazio Gallo, Iuri Frosio, and Jan Kautz, "Loss Functions for Image Restoration with Neural Networks", IEEE Transactions on Computational Imaging, vol. 3, No. 1, Mar. 2017 (Year: 2017).*

(Continued)

Primary Examiner — Jiangeng Sun
(74) Attorney, Agent, or Firm — Brooks Kushman P.C.

(57) ABSTRACT

An image processing system, an image processing method and a display device are provided. The image processing system includes at least one resolution conversion sub-system. The resolution conversion sub-system includes a CNN module, a combiner and an activation module connected in a cascaded manner. The CNN module is configured to perform convolution operation on an input signal to acquire a plurality of first feature images having a first resolution. The combiner is configured to combine the first feature images into a second feature image having a second resolution greater than the first resolution. The activation module is connected to the combiner and configured to perform a selection operation on the second feature image using an activation function.

20 Claims, 7 Drawing Sheets (51) Int. Cl.
  *G06N 3/08* (2006.01)
  *G06T 5/50* (2006.01)
(52) U.S. Cl.
  CPC .............. *G06T 3/4053* (2013.01); *G06T 5/50* (2013.01); *G06T 2207/10024* (2013.01); *G06T 2207/20081* (2013.01); *G06T 2207/20084* (2013.01); *G06T 2207/20212* (2013.01)

(56) References Cited

U.S. PATENT DOCUMENTS

| | | | |
|---|---|---|---|
| 2018/0268284 A1* | 9/2018 | Ren | G06N 3/04 |
| 2018/0322614 A1* | 11/2018 | Petrova | G06T 5/20 |
| 2019/0045168 A1* | 2/2019 | Chaudhuri | G06T 1/20 |
| 2019/0095795 A1* | 3/2019 | Ren | G06N 3/082 |
| 2019/0139205 A1* | 5/2019 | El-Khamy | G06K 9/6256 |

FOREIGN PATENT DOCUMENTS

| | | |
|---|---|---|
| CN | 106600553 A | 4/2017 |
| CN | 107169927 A | 9/2017 |

OTHER PUBLICATIONS

International Search Report and Written Opinion for Application No. PCT/CN2017/117116, dated Feb. 26, 2018, 10 Pages.

\* cited by examiner

IMAGE PROCESSING SYSTEM, IMAGE PROCESSING METHOD AND DISPLAY DEVICE

CROSS-REFERENCE TO RELATED APPLICATIONS

This application is the U.S. national phase of PCT Application No. PCT/CN2017/117116 filed on Dec. 19, 2017, which claims priority to Chinese Patent Application No. 201710324036.9 filed on May 8, 2017, which are incorporated herein by reference in their entireties.

TECHNICAL FIELD

The present disclosure relates to the field of image signal processing technology, in particular to an image processing system, an image processing method and a display device.

BACKGROUND

During the image signal processing, usually standard up-sampling modes such as bicubic and linear standard up-sampling modes are adopted so as to increase a resolution of an image. However, it is impossible for an image signal processing method in the related art to process an image flexibly.

SUMMARY

In one aspect, the present disclosure provides in some embodiments an image processing system, including at least one resolution conversion sub-system. The resolution conversion sub-system includes a convolutional neural network (CNN) module, a combiner and an activation module connected to each other in a cascaded manner. The CNN module is configured to perform convolution operation on an input signal so as to acquire a plurality of first feature images having a first resolution. The combiner is configured to combine the first feature images into a second feature image having a second resolution greater than the first resolution. The activation module is connected to the combiner and configured to perform a selection operation on the second feature image using an activation function.

In another aspect, the present disclosure provides in some embodiments a display device including an image processing system. The image processing system includes at least one resolution conversion sub-system. The resolution conversion sub-system includes a CNN module, a combiner and an activation module connected to each other in a cascaded manner. The CNN module is configured to perform convolution operation on an input signal so as to acquire a plurality of first feature images having a first resolution. The combiner is configured to combine the first feature images into a second feature image having a second resolution greater than the first resolution. The activation module is connected to the combiner and configured to perform a selection operation on the second feature image using an activation function.

In yet another aspect, the present disclosure provides in some embodiments an image processing method, including steps of: performing convolution operation on an input signal so as to acquire a plurality of first feature images having a first resolution; combining the first feature images into a second feature image having a second resolution greater than the first resolution; and performing a selection operation on the second feature image using an activation function.

In still yet another aspect, the present disclosure provides in some embodiments an electronic device, including one or more processors, a memory, and one or more programs stored in the memory and configured to be executed by the one or more processors so as to implement the above-mentioned image processing method.

In still yet another aspect, the present disclosure provides in some embodiments a computer-readable storage medium storing therein a computer program which is executed by a processor so as to implement the above-mentioned image processing method.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
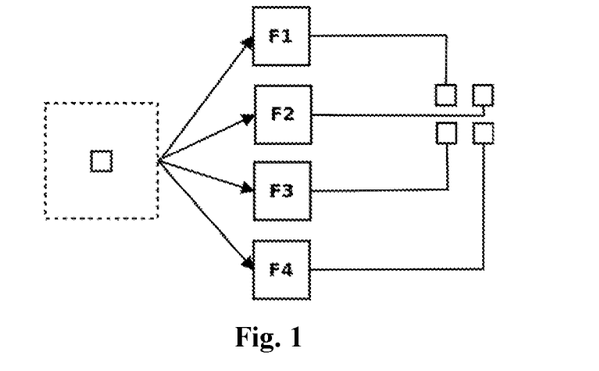
FIG. 1 is a schematic view showing a 2× up-sampling mode in the related art.

As shown in FIG. 1, in a 2× up-sampling mode in the related art, four different filters F1, F2, F3 and F4 are used with respect to pixels (including neighboring pixels) of an input image, and a quarter of pixels of an output image are generated by each filter. In other words, the input image is processed (convoluted) by the four filters, and then staggered or reused to create a single output image having a width and a height twice a width and a height of the input image. However, for this image processing method, a computational burden is relatively large, and it is impossible to flexibly adjust an up-sampling factor.

Figure 2:
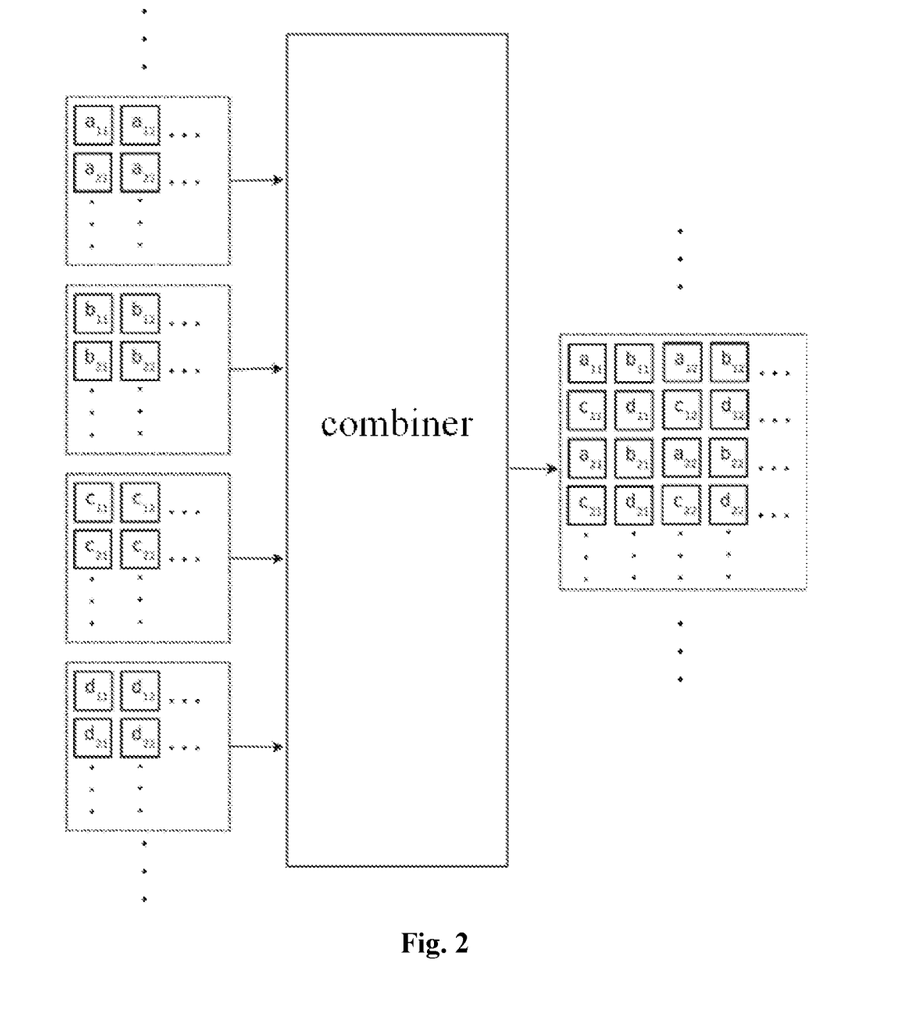
FIG. 2 is a schematic view showing an up-sampling procedure of a combiner of an image up-sampling system in the related art.

In order to reduce the data computation burden and flexibly adjust the up-sampling factor, a method of increasing a resolution of a video image through a CNN has been proposed in the related art. As shown in FIG. 2, every four feature images of the inputted feature images are classified into one group, and after the pixels of the images are crossed, all the groups of feature images are combined into a feature image having a resolution four times that of the input image. Obviously, it is merely able for this method to generate the feature image in a fixed pixel arrangement mode. Hence, it is impossible for the image processing method in the related art to process the image flexibly.

An object of the present disclosure is to provide an image processing system, an image processing method and a display device, so as to solve the above problem.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 3:
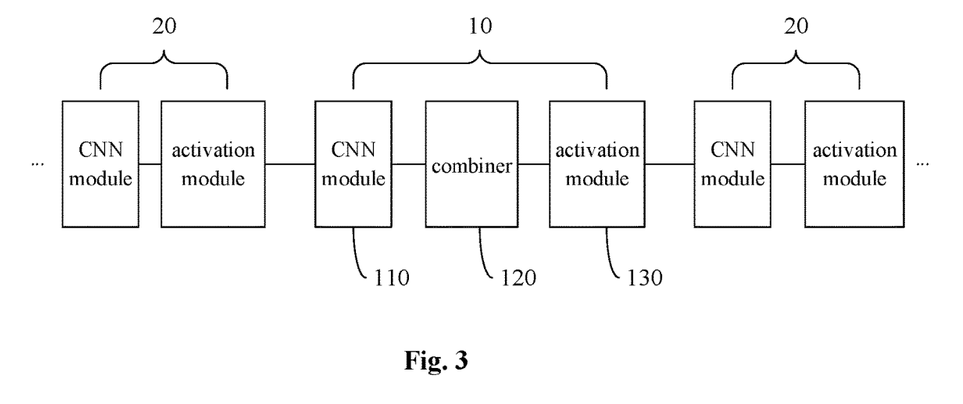
FIG. 3 is a schematic view showing an image processing system according to one embodiment of the present disclosure.

The present disclosure provides in some embodiments an image processing system which, as shown in FIG. 3, includes at least one resolution conversion sub-system 10. The resolution conversion sub-system 10 includes a CNN module 110, a combiner 120 and an activation module 130 connected to each other in a cascaded manner. The CNN module 110 is configured to perform convolution operation on an input signal so as to acquire a plurality of first feature images having a first resolution. The combiner 120 is configured to combine the first feature images into a second feature image having a second resolution greater than the first resolution. The activation module 130 is connected to the combiner 120 and configured to perform a selection operation on the second feature image using an activation function.

In a possible embodiment of the present disclosure, the image processing system may further include one or more CNN sub-systems (CNNSS) 20 connected to each other in a cascaded manner, and a connection relationship between the CNN sub-systems 20 and the resolution conversion sub-systems 10 may be set in accordance with the practical need. For example, two CNN sub-systems 20 may be connected to an input end of each resolution conversion sub-system (RCSS) 10 in a cascaded manner, and two CNN sub-systems 20 may be connected to an output end of each resolution conversion sub-system 10 in a cascaded manner. It should be appreciated that the number and positions of the CNN sub-systems 20 will not be particularly defined herein. In the embodiments of the present disclosure, each CNN sub-system 20 includes the CNN module and the activation module connected to each other in a cascaded manner.

It should be appreciated that, the image to be processed by the image processing system may be a video image capable of being played continuously. In the above image processing system, the input signal includes both the to-be-processed image and a noise image, and details of the noise image may be generated manually. In addition, more details may be generated with respect to the input image having a noise value greater than 1, so as to facilitate the processing of the video image in a more delicate manner. Further, for the video image, in the case that the noise image is added into the input signal, it is able to facilitate the input of a low-resolution frame and several previous frames, thereby to ensure the stability of the video image.

According to the image processing system in the embodiments of the present disclosure, the activation module 130 of the resolution conversion sub-system 10 may select adaptively the second feature image from the combiner 120, so as to generate the second feature images in different pixel arrangement modes, thereby to process the image flexibly. In addition, the combiner 120 may amplify the first feature images from the CNN module 110, so it is able to amplify the feature images as many as possible, thereby to improve an amplification effect.

Figure 4:
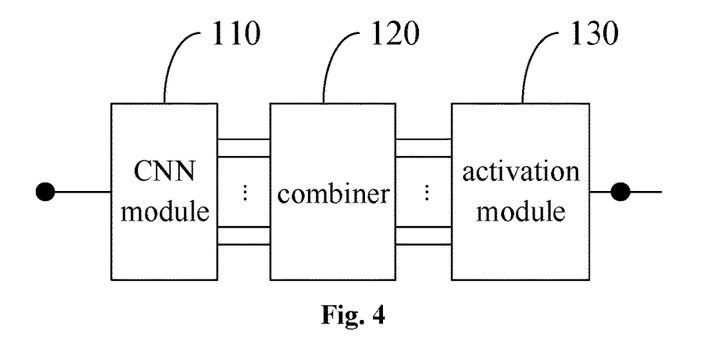
FIG. 4 is a schematic view showing a resolution conversion sub-system of the image processing system according to one embodiment of the present disclosure.
Figure 5:
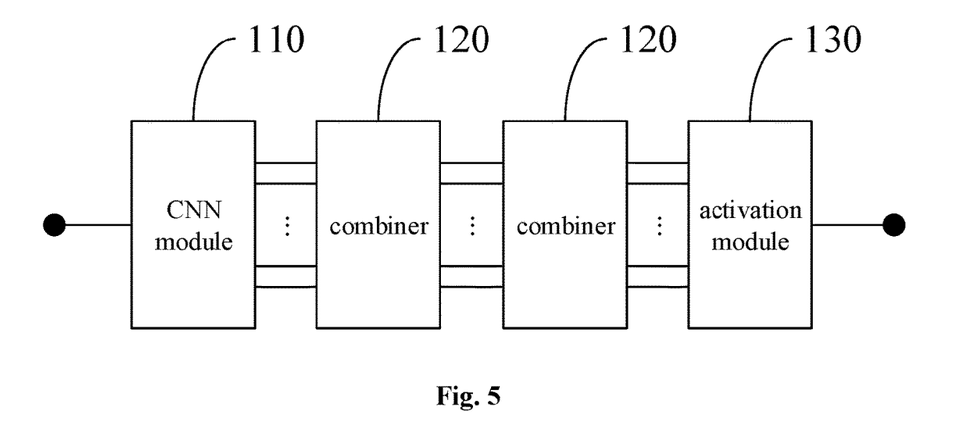
FIG. 5 is another schematic view showing the resolution conversion sub-system of the image processing system according to one embodiment of the present disclosure.
Figure 6:
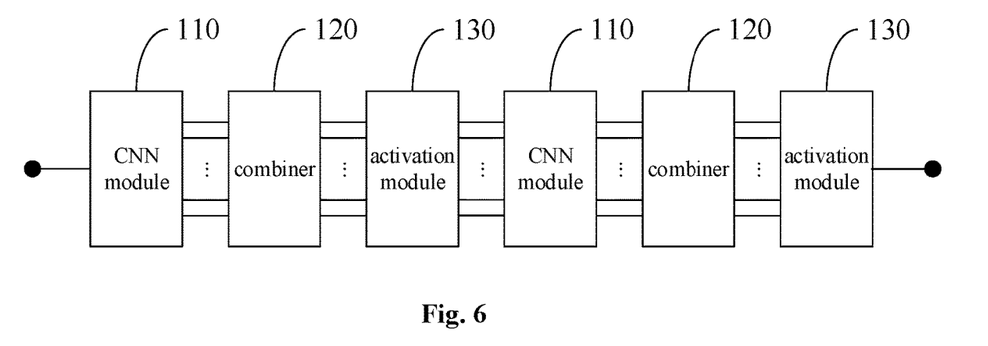
FIG. 6 is yet another schematic view showing the resolution conversion sub-system of the image processing system according to one embodiment of the present disclosure.

During the implementation, as shown in FIGS. 4 to 6, in the resolution conversion sub-system 10, the CNN module 110 of the resolution conversion sub-system 10 may be connected to the combiner 120 as one of follows of FIGS. 4-6. In FIG. 4, the resolution conversion sub-system 10 may include one CNN module 110, one combiner 120 and one activation module 130. A signal output end of the CNN module 110 is connected to a signal input end of the combiner 120, and a signal output end of the combiner 120 is connected to an input end of the activation module 130. In FIG. 5, the resolution conversion sub-system 10 may include one CNN module 110, two combiner 120 and one activation module 130. The signal output end of the CNN module 110 is connected to a signal input end of a first-level combiner 120, a signal output end of the first-level combiner 120 is connected to a signal input end of a second-level combiner 120, and a signal output end of the second-level combiner 120 is connected to the input end of the activation module 130. In FIG. 6, the resolution conversion sub-system 10 may include two CNN modules 110, two combiners 120 and two activation modules 130, and the CNN modules 110, the combiners 120 and the activation modules 130 are sequentially connected to each other in an alternate manner.

To be specific, in the image processing system in the embodiments of the present disclosure, in the case that the resolution conversion sub-system 10 includes a plurality of combiners 120, in order to enable each combiner to combine, during the amplifying process, the first feature images with high quality into the second feature image with high quality that has a resolution n times the resolution of the first feature image, as shown in FIG. 6, the signal input end of each combiner 120 may be connected to the output end of the corresponding CNN module 110, and the signal output end of each combiner 120 may be connected to the input end of the corresponding activation module 130. The first feature images are acquired by the CNN module 110 and then inputted to the input end of the corresponding combiner 120. In other words, in the resolution conversion sub-system 10, the CNN modules 110, the combiners 120 and the activation modules 130 may each be arranged in pairs.

In addition, in the image processing system in the embodiments of the present disclosure, in the case that a plurality of resolution conversion sub-systems 10 is provided, these resolution conversion sub-systems 10 may have a same amplification factor or different amplification factors. In the case that the same resolution conversion sub-system 10 includes a plurality of combiners 120, these combiners 120 may have a same amplification factor or different amplification factors. In FIGS. 5 and 6, in the case that each of the two combiners 120 has an amplification factor of M, the resultant image acquired after the treatment of the resolution conversion sub-system 10 may have a resolution $M^2$ times the resolution of the original feature image. In the case that the image processing system includes two resolution conversion sub-systems 10 having a same amplification factor, the resultant image acquired after the treatment of the resolution conversion sub-system 10 may have a resolution $M^4$ times the resolution of the original feature image.

During the implementation, in each resolution conversion sub-system, in the case that it is necessary to amplify the inputted first feature images by a relatively large amplification factor, each combiner may include a plurality of sub-combiners, so as to prevent the calculation accuracy and the processing speed of each combiner from being adversely affected. In addition, on the basis of the amplification factor by which the inputted first feature image is to be amplified, the amplification factor may be subjected to factorization, i.e., a large amplification factor may be factorized into a plurality of small amplification factors. At this time, each sub-combiner may amplify the inputted first feature image by a relatively small amplification factor. Hence, usually the number of the sub-combiners is arranged to be equal to the number acquired by subjecting the amplification factor of the resolution of the outputted second feature image relative to the resolution of the inputted first feature image to the factorization.

In addition, in a possible embodiment of the present disclosure, on the basis of a resolution of the inputted first feature images in a row direction and a resolution of the inputted first feature images in a column direction, a vertical sub-combiner in the column direction may be provided for amplifying the inputted first feature images, and a horizontal sub-combiner in the row direction may be provided for amplifying the inputted first feature images, i.e., the vertical sub-combiner and the horizontal sub-combiner may be used to amplify the inputted first feature images in the column direction and the row direction respectively. Hence, the sub-combiners may include the vertical sub-combiner configured to amplify the inputted first feature images in the column direction and the horizontal sub-combiner configured to amplify the inputted first feature images in the row direction.

In other words, in a possible embodiment of the present disclosure, the combiner is configured to amplify the resolution of the inputted first feature image by M times. The combiner includes: a plurality of sub-combiners connected to each other in a cascaded manner and configured to amplify the first feature images in both the column direction and the row direction, a product of the amplification factors of the sub-combiners being equal to M; or a plurality of horizontal sub-combiners and a plurality of vertical sub-combiners connected to each other in a cascaded manner, wherein the plurality of horizontal sub-combiners is configured to amplify the first feature images in the row direction, the plurality of vertical sub-combiners is configured to amplify the first feature images in the column direction, and a product of the amplification factor of the horizontal sub-combiners in the row direction and the amplification factor of the vertical sub-combiners in the column direction is equal to M.

Figure 7A:
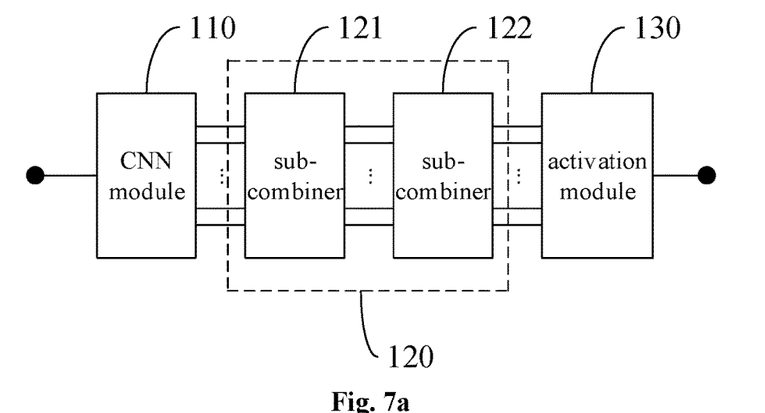
FIG. 7a is still yet another schematic view showing the resolution conversion sub-system of the image processing system according to one embodiment of the present disclosure.
Figure 7B:
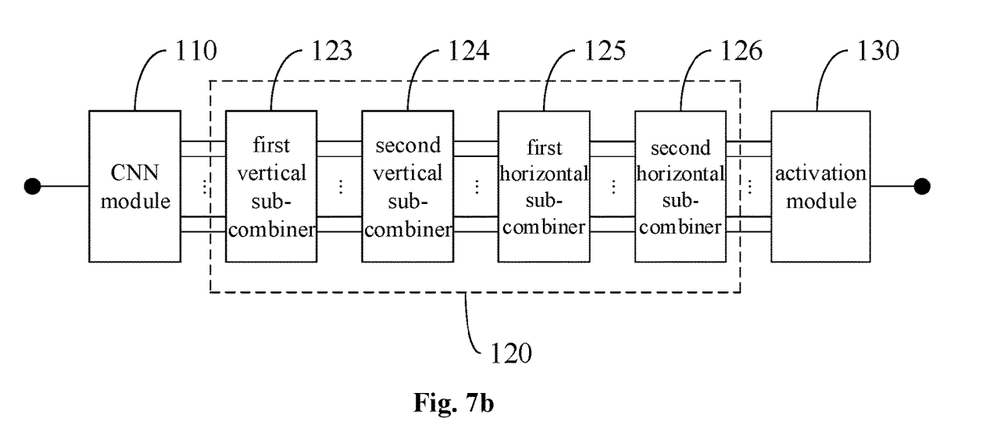
FIG. 7b is still yet another schematic view showing the resolution conversion sub-system of the image processing system according to one embodiment of the present disclosure.
Figure 7C:
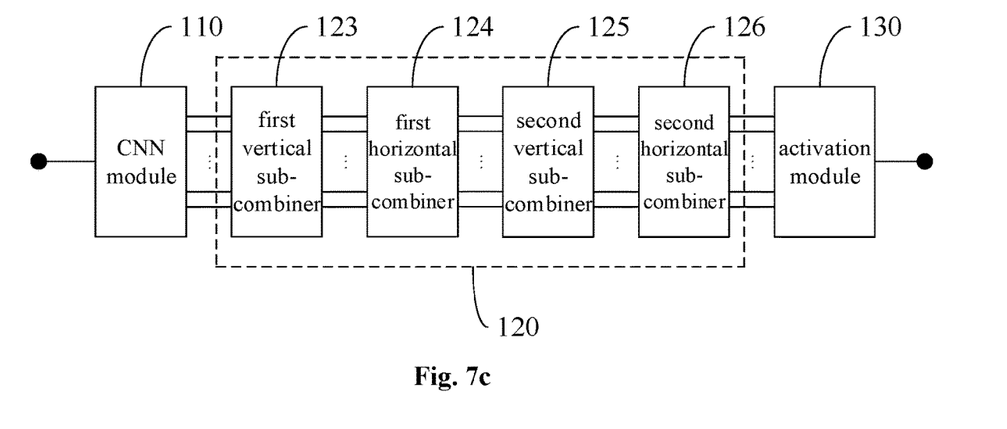
FIG. 7c is still yet another schematic view showing the resolution conversion sub-system of the image processing system according to one embodiment of the present disclosure.

To be specific, for example, in the case that the second feature image from the resolution conversion sub-system in FIG. 4 has a resolution 36 times (36×) greater than the inputted first feature images, the sub-combiners may be arranged in one of the following two modes. In a first arrangement mode, the amplification factor (i.e., 36×) may be factorized into 4× (2×2) and 9× (3×3), i.e., the large amplification factor may be factorized into two small amplification factors. Correspondingly, as shown in FIG. 7a, two sub-combiners may be provided, i.e., a sub-combiner 121 configured to amplify the resolution of the inputted first feature image by 4×, and a sub-combiner 122 configured to amplify the resolution of the inputted first feature image by 9×. In a second arrangement mode, the sub-combiner may include the vertical sub-combiners configured to amplify the inputted first feature images in the column direction, and the horizontal sub-combiners configured to amplify the inputted first feature images in the row direction. Correspondingly, in order to amplify the inputted first feature images by 36x, as shown in FIG. 7b, the sub-combiners may include a first vertical sub-combiner 123 configured to amplify the inputted first feature image by 2× (1×2), a second vertical sub-combiner 124 configured to amplify the inputted first feature image by 3× (1×3), a first horizontal sub-combiner 125 configured to amplify the inputted first feature image by 2× (2×1), and a second horizontal sub-combiner 126 configured to amplify the inputted first feature image by 3× (3×1). It should be appreciated that, the vertical sub-combiners and the horizontal sub-combiners may be arranged alternately, as shown in FIG. 7c. Through the abovementioned two arrangement modes, it is able to process the image in a multi-level and distributed manner, thereby to optimize each processing procedure and improve the processing efficiency of the video image.

In the embodiments of the present disclosure, the second feature images outputted by the combiner 120 may have different pixel arrangement modes, i.e., a plurality of second feature images in various pixel value arrangement modes may be generated. In this way, it is able for the generated second feature images to contain information about the first feature images in the input signal in a lossless manner, and for a next-level member connected to the signal output end of the activation module 130 to adaptively select among the second feature images, thereby to process the image flexibly without any image information being lost.

It should be appreciated that, the different resolution conversion sub-systems 10 may be provided with different types of combiners, so as to amplify the resolution of the image. For example, the first-level resolution conversion sub-system 10 may be provided with the horizontal sub-combiner for amplifying the inputted first feature images in the row direction, and the second-level resolution conversion sub-system 10 may be provided with the horizontal sub-combiner for amplifying the inputted first feature images in the column direction. It should be further appreciated that, the so-called "first feature image" and "second feature image" are merely used to represent the feature image before the conversion through the combiner and the feature image after the conversion through the combiner respectively, and they shall not be used to limit the image itself. In other words, with respect to all the combiners, the feature image inputted thereto is the first feature image, and the feature image outputted therefrom is the second feature image.

During the implementation, the image processing system may further comprise a conversion module (CM) configured to convert the input image that is in a red (R)-green (G)-blue (B) format into an image in a YUV format, and output a Y channel signal, a U channel signal and a V channel signal. The at least one resolution conversion sub-system 10 is configured to perform a resolution amplification on the Y channel signal, the U channel signal, and/or the V channel signal. In the embodiments of the present disclosure, the YUV format is an image format, and consists of Y, U and V, where Y represents lumen, and U and V represent chrominance.

Figure 8:
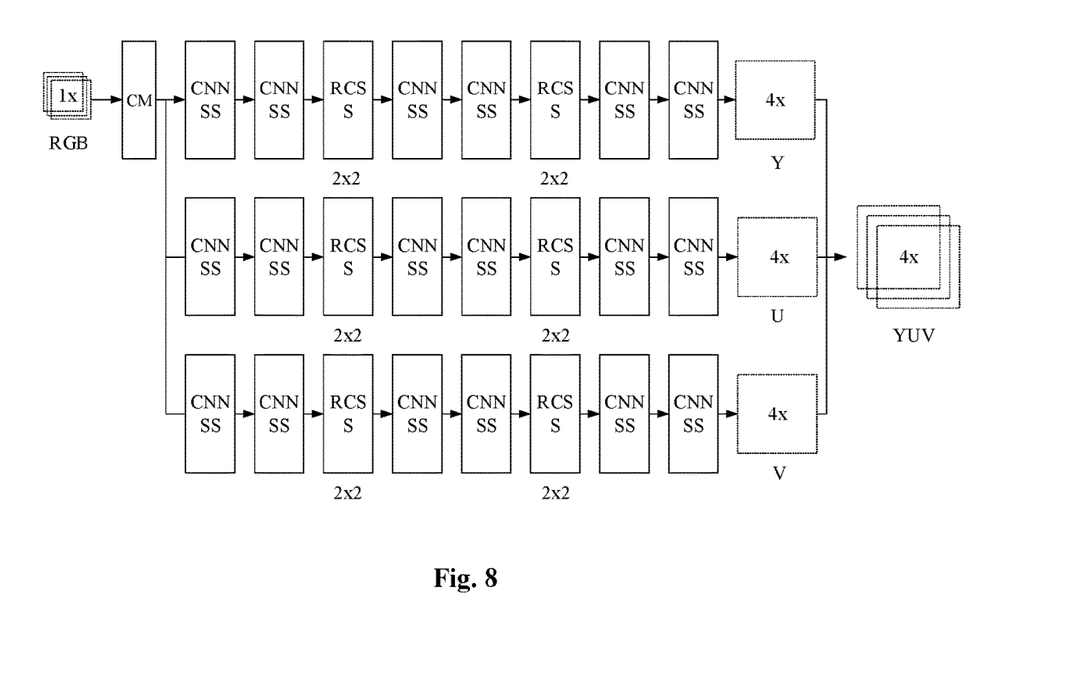
FIG. 8 is another schematic view showing the image processing system according to one embodiment of the present disclosure.
Figure 9:
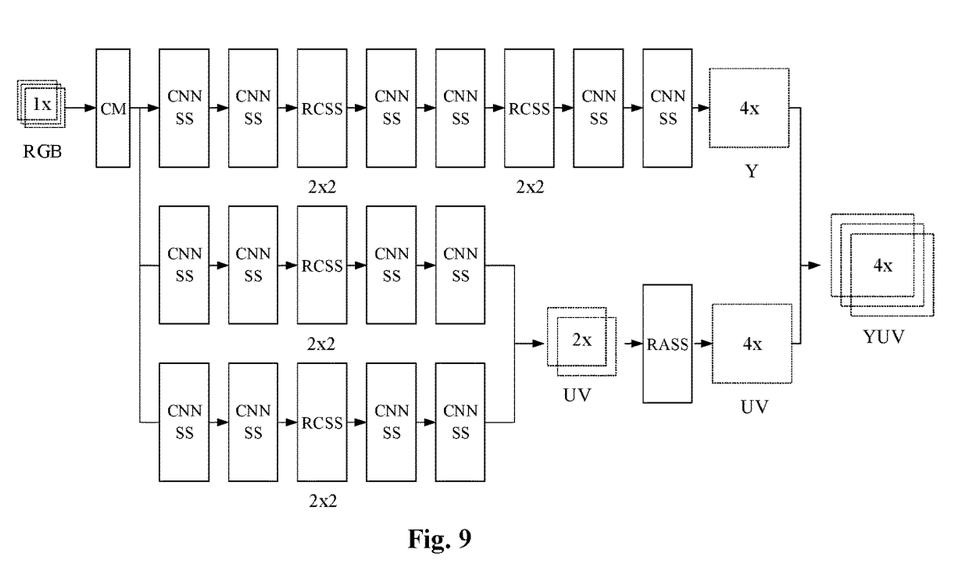
FIG. 9 is yet another schematic view showing the image processing system according to one embodiment of the present disclosure.
Figure 10:
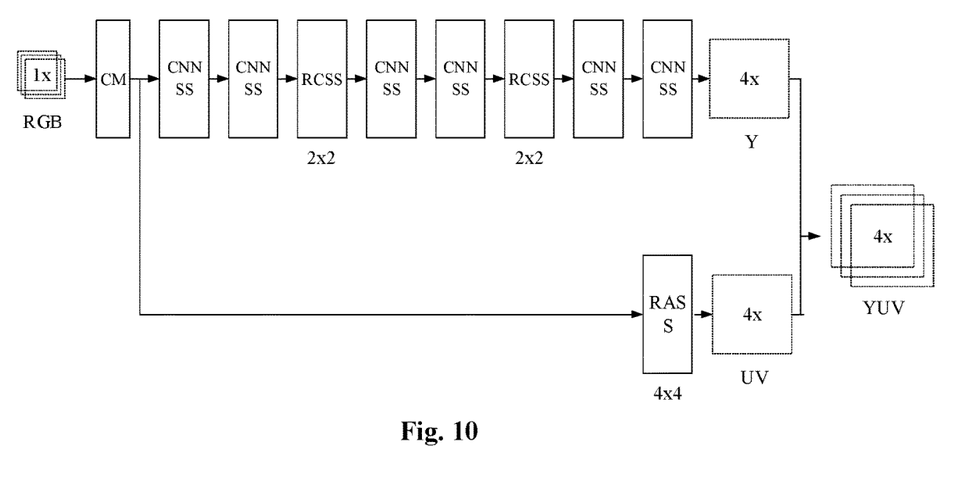
FIG. 10 is still yet another schematic view showing the image processing system according to one embodiment of the present disclosure.

As shown in FIGS. 8 to 10, the resolution conversion sub-system of the image processing system may be used to perform resolution amplification on the Y channel signal, the U channel signal and/or the V channel signal.

As shown in FIG. 8, the Y channel signal, the U channel signal and the V channel signal are each amplified by a corresponding amplification factor through the resolution conversion sub-system in the embodiments of the present disclosure.

As shown in FIG. 9, the Y channel signal is amplified by a corresponding amplification factor through the resolution conversion sub-system in the embodiments of the present disclosure, while the U channel signal and the V channel signal are amplified by a corresponding amplification factor through the cooperation of the resolution conversion sub-system in the embodiments of the present disclosure and a resolution amplification sub-system (RASS) in the related art.

For example, in the case that the resolution of the inputted image is to be amplified by an amplification factor of N through the image processing system, the at least one resolution conversion sub-system performs the resolution amplification on the Y channel signal by the amplification factor of N, the at least one resolution conversion sub-system performs the resolution amplification on the U channel signal by an amplification factor of N1, and the at least one resolution conversion sub-system performs the resolution amplification on the V channel signal by an amplification factor of N2, where N1 is smaller than N, and N2 is smaller than N, and the values of N1 and N2 may be set in accordance with the practical need, and are not particularly defined herein. For example, N may be 100, and N1 and N2 may each be 50. At this time, and the at least one resolution conversion sub-system performs the resolution amplification on the U channel signal and the V channel signal by 10 times, and meanwhile the resolution amplification sub-system in the related art performs the resolution amplification by 10 times. It should be appreciated that, in order to reduce the computation burden of the amplification, usually the at least one resolution conversion sub-system performs the resolution amplification on the U channel signal and the V channel signal by 10 times, and then after that, the resolution amplification sub-system in the related art performs the resolution amplification by 10 times. An algorithm used by the resolution amplification sub-system in the related art may be selected in accordance with the practical need, e.g., standard up-sampling modes such as bicubic and linear standard up-sampling modes may be used to amplify the resolution of the image.

As shown in FIG. 10, the at least one resolution conversion sub-system is configured to perform the resolution amplification on merely the Y channel signal, while the resolution amplification sub-system in the related art performs the resolution amplification on the U channel signal and the V channel signal.

In the embodiments of the present disclosure, it is necessary for the resolution conversion sub-system to perform a selection operation on the second feature image acquired after amplifying the first feature images, so the computation burden of the amplification is relatively large. In the embodiment of the present disclosure, any application mode in FIGS. 8 to 10 may be used to amplify the image in the case of taking a resource overhead of the system into consideration. The image information of the image may include color information and grayscale information. For an amplification technique, an amplification effect may be affected by the processing of the grayscale information more significantly than the color information. Hence, in the embodiment of the present disclosure, after the image in the RGB format has been converted into the image in the YUV format, the amplification mode in FIG. 9 or 10 may be adopted, so as to reduce the resource overhead of the system while ensuring the amplification effect.

To be specific, each channel signal may be processed through one or more resolution conversion sub-systems, and the number of the resolution conversion sub-systems for each channel signal may be set in accordance with the practical need, and is not particularly defined herein.

It should be appreciated that, the activation module 130 may perform a selection operation on the second feature image in accordance with the practical need. In a possible embodiment of the present disclosure, the activation module 130 is further configured to output the second feature image directly or output the second feature image with an offset in the case that a certain condition has been met, and otherwise discard the second feature image.

The above condition may be set in accordance with the practical need. For example, in a possible embodiment of the present disclosure, the second feature image may be compared with −b (a negative number of the offset parameter b), and it determines whether to output the second feature image and how to output the second feature image in accordance with a comparison result. To be specific, in the case that the second feature image is greater than −b, the second feature image may be outputted directly, or the second feature image with the offset parameter b may be outputted. In the case that the second feature image is smaller than or equal to −b, the second feature image may be discarded directly, i.e., no image may be outputted. The second feature image has a weight parameter a for convolution operation.

In the related art, during the convolution operation, usually the weight parameter a and the offset parameter b are included. However, in the embodiments of the present disclosure, it is found through experiments that, as compared with the use of both the weight parameter a and the offset parameter b, it is able to achieve the same amplification effect using merely the weight parameter in the convolution operation, and meanwhile reduce the training and debugging difficulty.

In addition, in the resolution conversion sub-system 10, the combiner may be used to amplify the resolution of the image by M times. To be specific, the combiner is further configured to cross pixel values of every M first feature images, combine the crossed pixel values of the every M first feature images into M second feature images, and output the M second feature images.

During the implementation, in the case that the image is to be amplified by the resolution conversion sub-system 10 by M times, an amplification factor Mx in the row direction and an amplification factor My in the column direction of the inputted first feature image may be determined relative to the second feature image, where Mx and My are each a positive integer. The combiner is further configured to cross the pixel values of every M first feature images of the inputted first feature images, and combine the crossed pixel values into M second feature images each having a resolution M times the resolution of the inputted first feature image, and output the M second feature images. The number of the inputted first feature images is an integral multiple of M. As compared with the inputted first feature image, the second feature image is amplified by Mx times in the row direction, and is amplified by My times in the column direction.

Figure 11:
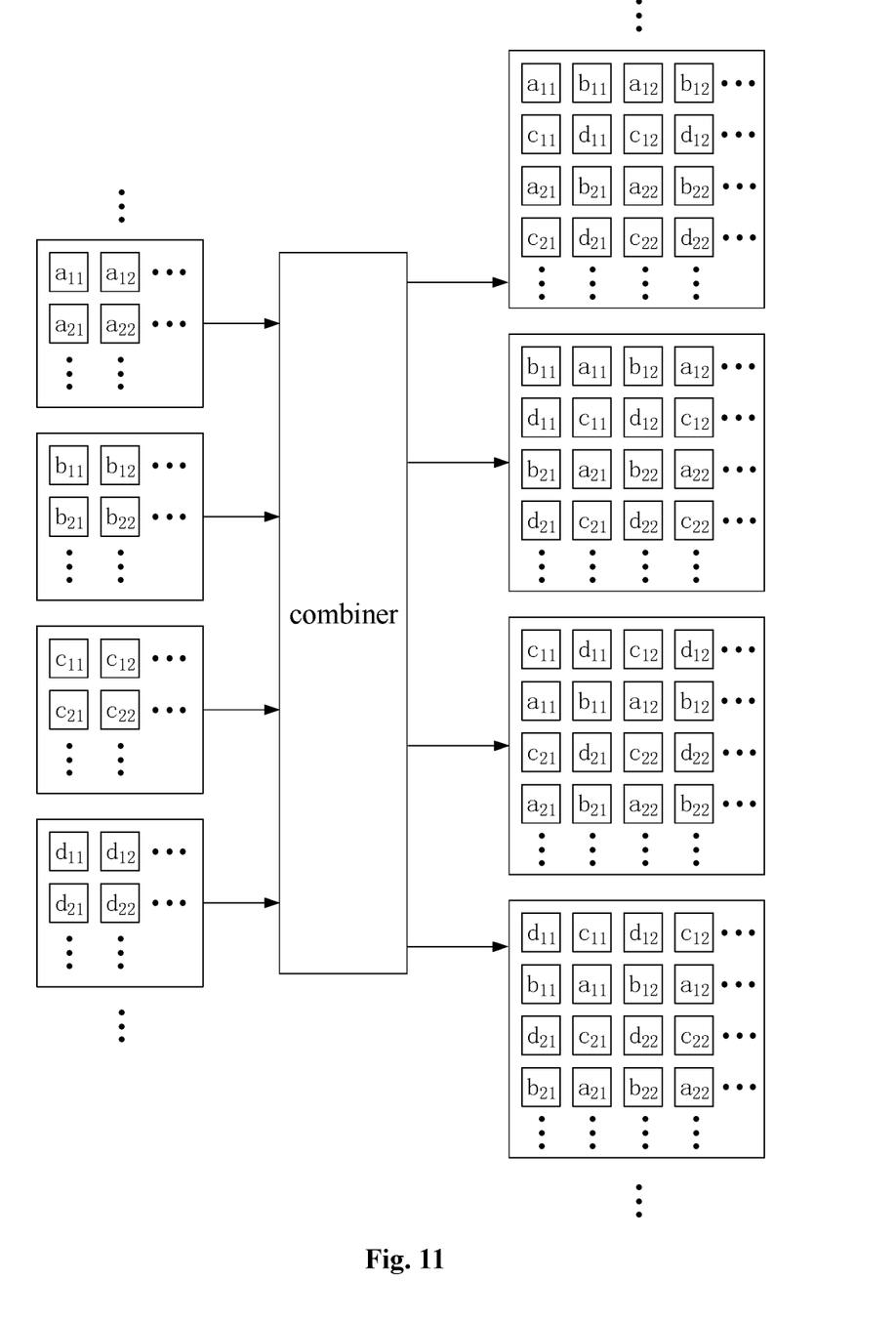
FIG. 11 is a schematic view showing an amplification procedure of a combiner of the resolution conversion sub-system of the image processing system according to one embodiment of the present disclosure.

To be specific, taking the combiner 120 of the resolution conversion sub-system 10 in FIG. 6 as an example, in FIG. 11, the combiner 120 is configured to amplify the inputted first feature image by 4 times, i.e., the amplification factor Mx of the inputted first feature image relative to the outputted second feature image in the row direction is 2, and the amplification factor My of the inputted first feature image relative to the outputted second feature image in the column direction is 2. Hence, the combiner 120 may cross the pixel values of the 4 inputted first feature images, combine the crossed pixel values into 4 feature images each having a resolution 4 times the resolution of the inputted first feature image, and output the 4 feature images to the activation module 130. Then, the activation module 130 may perform a selection operation on the second feature image adaptively, and output the selected second feature image to a next-level resolution conversion sub-system for the subsequent amplification and adaptive selection. In this way, it is able to process the video image flexibly.

During the implementation, in the above image processing system, each combiner may be an adaptive interpolation filter. As shown in FIG. 11, every four first feature images of the inputted first feature image are classified into one group, and the combiner is further configured to cross the pixel values of the one group of first feature images, generate four second feature images each having a resolution 4 times the resolution of the inputted first feature image, and output the four second feature images. As shown in FIG. 11, for an operating principle of the combiner, pixel values of the same pixels in the four inputted first feature images may be arranged in a matrix form, and recorded in the second feature images. Hence, during the amplification, any pixel information contained in the feature image may not be modified (discarded or added).

To be specific, in the above image processing system, in order to determine the second feature image outputted by the combiner, the combiner may acquire the second feature image using the following equation:

$$y_{p,q}^c = U^n(x_{i,j}^c) = \begin{cases} x_{i,j}^c & \text{if} \quad \begin{array}{l} i = Myp + a, \quad j = Mxq + b, \\ a = (n-1)\% \, My, \quad b = \lfloor (n-1)/My \rfloor, \end{array} \\ 0 & \text{or else} \end{cases}$$

where i has a value within the range of (0, ..., H−1), j has a value within the range of (0, ..., W−1), p has a value within the range of (0, ..., MyH−1), q has a value within the range of (0, ..., M×W−1), H represents a height of the second feature image, W represents a width of the second feature image, c represents the number of the first feature images, Mx represents the amplification factor of the first feature image relative to the second feature image in the row direction, My represents the amplification factor of the first feature image relative to the second feature image in the column direction, % represents a rem operation, $\lfloor (n-1)/M_y \rfloor$ represents a maximum integer smaller than (n−1)/My, $x_{i,j}^c$ represents the first feature image, $y_{p,q}^c$ and $U^n(x_{i,j}^c)$ represent the second feature images, and n represents a serial number of the second feature image.

In a possible embodiment of the present disclosure, training of the CNN module and the activation module is determined on the basis of a cost function of a Structural Similarity Image Measurement (SSIM)-based criterion. In this embodiment of the present disclosure, the cost function may be expressed as:

Cost(INPUT,REFRENCE)=1−SSIM(Output(INPUT)+REFERENCE)+λ₁DownReg(INPUT)+λ₂WBratioReg(W,b), where INPUT represents an original image, SSIM represents a structural similarity Image Measurement calculation function, DownReg(INPUT) represents a function for calculating a similarity between the original image and a training image, λ1 represents a weight coefficient of DownReg (INPUT), λ2 represents a weight coefficient of WBratioReg (W,b), WBratioReg(W,B) represents a function for calculating a weight-to-offset ratio and $$WBrationRef(W, b) = \frac{L1(W)}{L1(b) + eps},$$

L1(W) represents an L1 norm of the weight parameter, L1(b) represents an L1 norm of the offset parameter, and eps represents a constant.

During the operation of the system, each filter is provided with a scalar weight and a relative constant offset. Therefore, before the operation of the system, it is necessary to train the system using a series of standard input images and output images, and a certain application may be used to enable the system to meet a certain optimization criterion. Hence, before the operation of the image processing system, it is necessary to train the image processing system. In the embodiments of the present disclosure, the training of the CNN and the activator may be optimized as follows.

Based on the sub-systems and the modules in each sub-system in FIG. 3, no parameter is introduced into the combiner, so the parameters involved in the image processing system in the embodiments of the present disclosure merely include the weight parameter of the CNN and the offset parameter of the activator.

During the training procedure, at first a series of training images need to be provided, and these training images may be acquired as follows.

These training images may be derived from a database which contains a large number of sample images, e.g., 500 images each having a resolution of 480*320. Some of the sample images may be selected randomly as the training images, and then a certain number of image blocks each having a resolution of 80*80 (e.g., 30000 image blocks) may be selected randomly from the selected sample images. These randomly-selected image blocks constitute the training images.

After the acquisition of the training images, various standard resolution compression algorithms may be adopted so as to reduce the resolution of the training image by a factor of X, thereby to acquire the original image to be inputted to the image processing system.

After the acquisition of the original image, the original image may be inputted to the image processing system whose parameters have been initialized. Then, the parameters of the image processing system may be adjusted, so as to enable the image processing system to amplify the original image by X times, thereby to acquire a target image.

The parameters may be adjusted using any known algorithm, e.g., a standard stochastic gradient descent (SGD) algorithm. It may determine whether the parameter is appropriate using a cost function COST of the target image and the training image. In the case that a difference between the target image and the training image is relatively small, it means that a better amplification effect has been achieved by the image processing system and a value of COST is relatively small. Otherwise, the amplification effect is insufficient.

In the related art, the cost function COST may be treated in various criterions, e.g., commonly-used mean square error (MSE). However, it is found that, the criterions in the related art are associated with a human visual system in an insufficient manner.

To be specific, the image information of the image includes color information and grayscale information, and the human visual system is sensitive to different parameters at different levels. In the related art, in the case that the criterions are used to determine whether the parameters are appropriate, the color information and the grayscale information are treated equally, so these criterions are associated with the human visual system in an insufficient manner.

It is found through studies that, it is able to train the CNN and the activator in a better manner in the case that the SSIM criterion is adopted.

More specifically, the SSIM criterion refers to a full-reference image quality evaluation index for determining the image similarity in terms of brightness, contrast and structure, and it may be expressed as follows:

$$SSIM = \frac{(2u_O u_R + C1)(2\sigma_{OR} + C2)}{(u_O^2 + u_R^2 + C1)(\sigma_O^2 + \sigma_R^2 + C2)},$$

where $u_O$ and $u_R$ represent mean values of the target image and the original image respectively, $\sigma_O$ and $\sigma_R$ represent variances of the target image and the original image respectively, $\sigma_{OR}$ represents a covariance between the target image and the original image Y, and C1 and C2 are each a non-zero constant. SSIM has a value within the range of [0,1]. The larger the value of SSIM, the smaller the distortion of the image. In the case that the value of SSIM is 1, it means that the target image is completely the same as the original image.

In actual use, the image may be divided into N image blocks using a sliding window. Due to the influence of a shape of the sliding window on the image blocks, a mean value, a variance and a covariance of each window may be calculated through Gaussian weight operation, then the SSIM of a corresponding image block may be calculated, and then an average value of the SSIMs may be used as the SSIM of the two images, i.e., Mean SSIM (MSSIM):

$$MSSIM(X, Y) = \frac{1}{N} \sum_{k=1}^{N} SSIM(x_k, y_k).$$

The cost function COST may be expressed as 1-SSIM so as to represent the difference between the target image and the original image, i.e., COST=1-SSIM.

In the embodiments of the present disclosure, in order to further increase a convergence degree of the CCN and the activator, any other parameter, e.g., an L1 norm of the weight parameter, may be introduced into the cost function COST.

In a possible embodiment of the present disclosure, two new parameters, i.e., DownReg(INPUT) and a weight-to-offset ratio function, are provided. Wherein, DownReg(INPUT)=MSE(Downscale(Output(INPUT)),INPUT) or DownReg(INPUT)=1-SSIM(Downscale(Output(INPUT)), INPUT), where INPUT represents the original image, Downscale(Output(INPUT) represents the training image, MSE represents a function for calculating a mean square error of the image, and SSIM represents a function for calculating a structural similarity.

In order to classify the features, the weight parameter and the offset parameter may be adopted by the CNN (including the CNN module and the activator). Ideally, the offset parameter shall be as large as possible relative to the weight parameter.

Therefore, the weight-to-offset ratio function may be expressed as follows:

$$WBratioReg(W, b) = \frac{L1(W)}{L1(b) + eps},$$

where L1(W) represents an L1 norm of the weight parameter and $$L1(W) = \frac{1}{LFNM} \sum_{l,f,i,j}^{L,F,N,M} |W_{i,j}^{f,l}|,$$

L1(B) represents an L1 norm of the offset parameter and $$L1(b) = \frac{1}{LF} \sum_{i,f}^{L,F} |b^{f,l}|,$$

l represents a serial number of a layer of the CNN, f represents a serial number of the feature, N*M represents a size of the filer, and eps is a very small constant, e.g., 1e-6. Wherein Cost=1−SSIM(Output(INPUT)+REFERENCE)+
    $\lambda_1$DownReg(INPUT)+$\lambda_2$WBratioReg($W,b$)

where λ1 represents a weight coefficient of DownReg(INPUT), λ2 represents a weight coefficient of WBratioReg(W, b), and a value of each of λ1 and λ2 depends on its importance.

Based on an identical inventive concept, the present disclosure further provides in some embodiments a display device including the above-mentioned image processing system. The display device may be any product or member having a display function, e.g., mobile phone, flat-panel computer, television, display, notebook computer, digital photo frame or navigator. The implementation of the display device may refer to that of the image processing system mentioned above, and thus will not be particularly defined herein. The display device includes the above-mentioned image processing system, so it may have the same beneficial effect as the image processing system.

Figure 12:
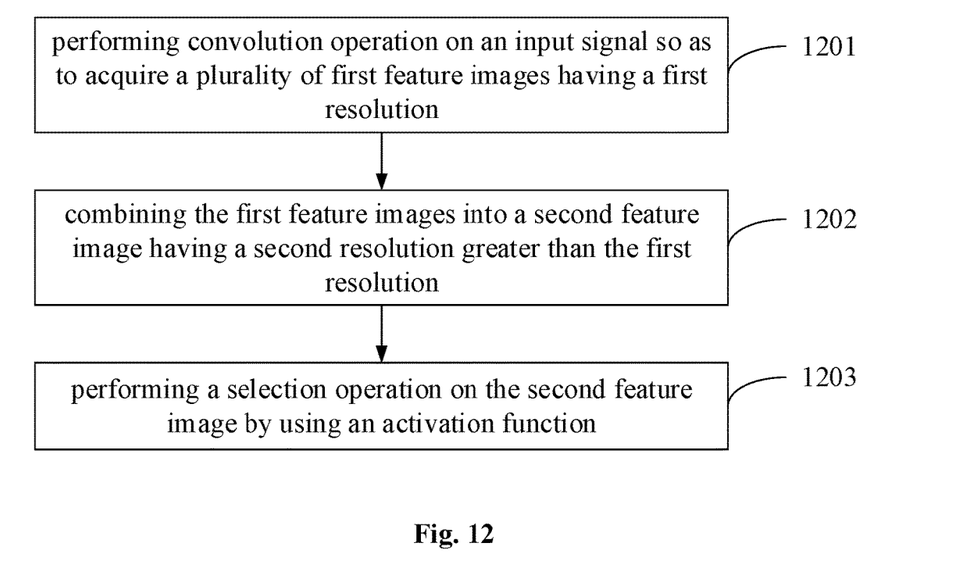
FIG. 12 is a flow chart of an image processing method according to one embodiment of the present disclosure.

Based on an identical inventive concept, the present disclosure further provides in some embodiments an image processing method for use in the above-mentioned image processing system. As shown in FIG. 12, the image processing method includes: Step 1201 of performing convolution operation on an input signal so as to acquire a plurality of first feature images having a first resolution; Step 1202 of combining the first feature images into a second feature image having a second resolution greater than the first resolution; and Step 1203 of performing a selection operation on the second feature image using an activation function.

To be specific, Step 1201 may be executed by the CNN module of the resolution conversion sub-system, Step 1202 may be executed by the combiner of the resolution conversion sub-system, and Step 1203 may be executed by the activation module of the resolution conversion sub-system. The structures of the CNN module, the combiner and the activation module may refer to those mentioned above, and thus will not be particularly defined herein.

According to the image processing method in the embodiments of the present disclosure, the convolution operation is performed on the input signal so as to acquire the plurality of first feature images having the first resolution, then the first feature images are combined into the second feature image having the second resolution greater than the first resolution, and then the second feature image is selected using the activation function. The activation module of the resolution conversion sub-system may select adaptively the second feature image from the combiner, so as to generate the second feature images in different pixel arrangement modes, thereby to process the image flexibly. In addition, the combiner may amplify the first feature images from the CNN module 110, so it is able to amplify the feature images as many as possible, thereby to improve an amplification effect.

Figure 13:
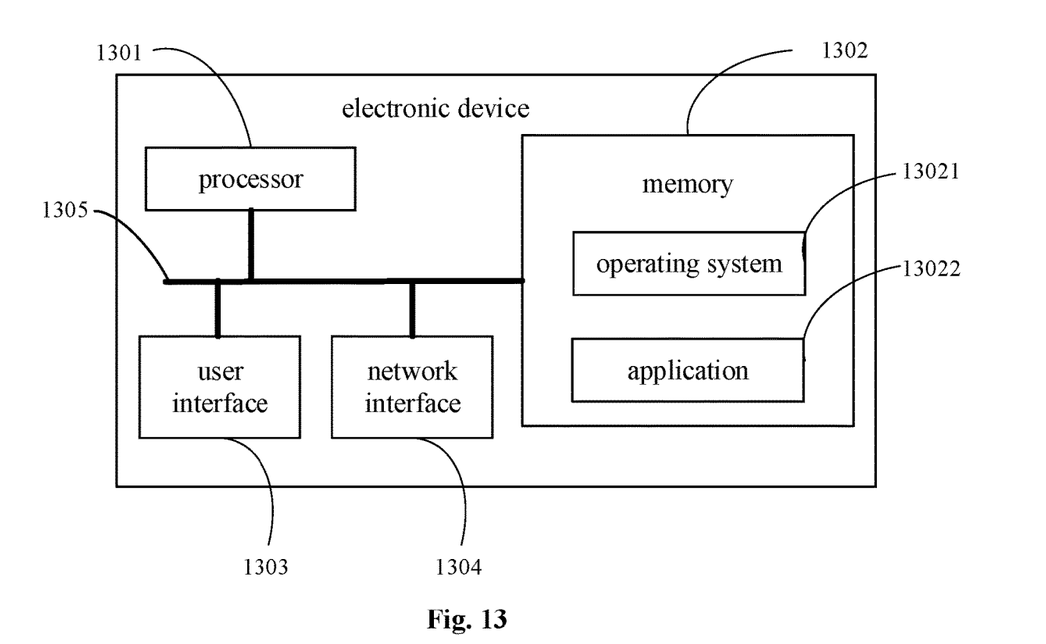
FIG. 13 is a schematic view showing an electronic device according to one embodiment of the present disclosure.

The present disclosure further provides in some embodiments an electronic device which, as shown in FIG. 13, includes at least one processor 1301, a memory 1302, at least one network interface 1304 and a user interface 1303. The members of the electronic device may be coupled to each other via a bus system 1305. It should be appreciated that, the bus system 1305 is configured to establish connection and communication among the members. Apart from a data bus, the bus system 1305 may further include a power source bus, a control bus and a state signal bus. For clarification, all the buses in FIG. 13 are called as the bus system 1305. The user interface 1303 may include a display, a keyboard or a pointing device (e.g., mouse, track ball, touch plate or touch panel).

It should be appreciated that, in the embodiment of the present disclosure, the memory 1302 may be a volatile memory, a nonvolatile memory, or both. The nonvolatile memory may be a Read-Only Memory (ROM), a Programmable ROM (PROM), an Erasable PROM (EPROM), an Electrically EPROM (EEPROM) or a flask memory. The volatile memory may be a Random Access Memory (RAM) which serves as an external cache. Illustratively, various RAMs may be adopted, e.g., Static RAM (SRAM), Dynamic RAM (DRAM), Synchronous DRAM (SDRAM), Double Data Rate SDRAM (DDRSDRAM), Enhanced SDRAM (ESDRAM), Synch Link DRAM (SLDRAM), and Direct Rambus RAM (DRRAM). The memory 1302 described in the embodiments of the present disclosure intends to include, but not limited to, the above-mentioned memories or any other suitable memories.

In a possible embodiment of the present disclosure, an operating system 13021 and an application 13022, and/or executable modules or data structures, or subsets or a set of extensions thereof, may be stored in the memory 1302.

The operating system 13021 may include various system programs, e.g., a framework layer, a core layer and a driving layer, so as to implement various basic services and process hardware-based tasks. The application 13022 may include various applications, e.g., media player and browser, so as to implement various application services. A program for executing the above-mentioned image processing method may be contained in the application 13022.

In the embodiments of the present disclosure, the processor 1301 is configured to call programs or instructions stored in the memory 1302 (e.g., programs or instructions stored in the application 13022), so as to perform convolution operation on an input signal to acquire a plurality of first feature images having a first resolution, combine the inputted first feature images into a second feature image having a second resolution greater than the first resolution, and perform a selection operation on the second feature image using an activation function.

The present disclosure further provides in some embodiments a computer-readable storage medium storing therein a computer program which is executed by a processor so as to perform the steps of the above-mentioned image processing method.

It should be appreciated that, the units and the steps mentioned above may be implemented by hardware, or by hardware and software, depending on a specific application and a constraint condition. With respect to each specific application, a person skilled in the art may adopt different methods to achieve the mentioned functions without departing from the scope of the present disclosure.

For convenience and clarification, the operational procedures of the system, device and units may refer to the above embodiments concerning the method, and thus will not be repeated herein.

It should be further appreciated that, the apparatus and method may be implemented in any other ways. For example, the embodiments for the apparatus are merely for illustrative purposes, and the units are provided merely on the basis of their logic functions. During the actual application, some units may be combined together or integrated into another system. Alternatively, some functions of the units may be omitted or not executed. In addition, the coupling connection, direct coupling connection or communication connection between the units may be implemented via interfaces, devices or units, and the indirect coupling connection or communication connection between the units may be implemented in an electrical or mechanical form or in any other form.

The units as separate components may be, or may not be, separated from each other physically, and the components may be, or may not be, physical units. They may be located at an identical position, or distributed over a plurality of network elements. All or parts of the components may be selected in accordance with the practical need so as to achieve the object of the present disclosure.

In addition, the functional units in the embodiments of the present disclosure may be integrated into a processing unit, or the functional units may exist independently and physically, or two or more functional units may be combined together.

In the case that the integrated functional units are implemented in a software form and sold or used as a separate product, they may be stored in a computer-readable medium.

Based on this, the technical solutions of the present disclosure, partial or full, or parts of the technical solutions of the present disclosure contributing to the related art, may appear in the form of software products, which may be stored in a storage medium and include several instructions so as to enable a computer equipment (a personal computer, a server, network equipment, or the like) to execute all or parts of the steps of the methods according to the embodiments of the present disclosure. The storage medium may be any medium that is capable of storing program codes, such as a universal serial bus (USB) flash disk, a mobile hard disk (HD), a ROM, a RAM, a magnetic disk or an optical disk.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure. A protection scope of the present application is defined by claims.

What is claimed is:

1. An image processing system, comprising at least one resolution conversion sub-system, where the resolution conversion sub-system comprises a convolutional neural network (CNN) circuit, a combining circuit and an activation circuit, and the CNN circuit, the combining circuit and the activation circuit are connected in a cascaded manner,
the CNN circuit is configured to perform convolution operation on an input signal, to acquire a plurality of first feature images having a first resolution,
the combining circuit is configured to combine the first feature images into a second feature image having a second resolution greater than the first resolution, and
the activation circuit is connected to the combining circuit, and configured to perform a selection operation on the second feature image by using an activation function,
wherein the activation circuit is further configured to:
in the case that a predetermined condition has been met, output directly the second feature image or output the second feature image added with an offset or
in the case that the predetermined condition has not been met, discard the second feature image.

2. The image processing system according to claim 1, further comprising:
a conversion circuit configured to convert the input image received in a red (R)-green (G)-blue (B) format into an image in a YUV format, and output a Y channel signal, a U channel signal and a V channel signal,
wherein the at least one resolution conversion sub-system is configured to perform a resolution amplification on one or more of the Y channel signal, the U channel signal and the V channel signal.

3. The image processing system according to claim 2, wherein
the image processing system is configured to amplify the resolution of the input image by an amplification factor of N;
the at least one resolution conversion sub-system is further configured to perform the resolution amplification on the Y channel signal by the amplification factor of N;
the at least one resolution conversion sub-system is further configured to perform the resolution amplification on the U channel signal by an amplification factor of N1; and
the at least one resolution conversion sub-system is further configured to perform the resolution amplification on the V channel signal by an amplification factor of N2, where N1 is smaller than N, and N2 is smaller than N.

4. The image processing system according to claim 1, further comprising:
a conversion circuit, wherein the at least one resolution conversion sub-system is further configured to perform a resolution amplification on merely a Y channel signal.

5. The image processing system according to claim 1, wherein
the predetermined condition comprises that the second feature image is greater than a negative number of the offset.

6. The image processing system according to claim 1, wherein
the combining circuit is provided with a resolution amplification factor of M; and
the combining circuit is further configured to cross pixel values of every M first feature images, combine the every M first feature images with the crossed pixel values into M second feature images, and output the M second feature images.

7. The image processing system according to claim 6, wherein
the combining circuit is an adaptive interpolation filter.

8. The image processing system according to claim 7, wherein
the combining circuit is further configured to combine the first feature images into the second feature images using the following equation:

$$y_{p,q}^c = U^n(x_{i,j}^c) = \begin{cases} x_{i,j}^c & \text{if} \quad \begin{aligned} i &= Myp+a, & j &= Mxq+b, \\ a &= (n-1)\% \, My, & b &= \lfloor(n-1)/My\rfloor, \end{aligned} \\ 0 & \text{or else} \end{cases}$$

where i is a value within a range of (0, ..., H-1), j is a value within a range of (0, ..., W-1), p is a value within a range of (0, ..., MyH-1), q is a value within a range of (0, ..., MxW-1), H represents a height of the second feature image, W represents a width of the second feature image, c represents the number of the first feature images, Mx represents an amplification factor of the first feature image relative to the second feature image in a row direction, My represents an amplification factor of the first feature image relative to the second feature image in a column direction, $\lfloor(n-1)/My\rfloor$ represents a maximum integer smaller than (n-1)/My, $x_{i,j}^c$ represents the first feature image, $y_{p,q}^c$ and $U^n(x_{i,j}^c)$ represent the second feature images, and n represents a serial number of the second feature image.

9. The image processing system according to claim 1, wherein
the combining circuit is provided with a resolution amplification factor of M; and
the combining circuit comprises:
a plurality of combining sub-circuits connected in the cascaded manner, and configured to amplify the first feature images in both a column direction and a row direction, wherein a product of amplification factors of the combining sub-circuits is equal to M; or
a plurality of horizontal combining sub-circuits and a plurality of vertical combining sub-circuits, wherein the plurality of horizontal combining sub-circuits and the plurality of vertical combining sub-circuits are connected in the cascaded manner, the plurality of horizontal combining sub-circuits is configured to amplify the first feature images in the row direction, the plurality of vertical combining sub-circuits is configured to amplify the first feature images in the column direction, and a product of an amplification factor of the horizontal combining sub-circuits in the row direction and an amplification factor of the vertical combining sub-circuits in the column direction is equal to M.

10. The image processing system according to claim 1, wherein
training of the CNN circuit and the activation circuit is determined on the basis of a cost function of a Structural Similarity Image Measurement (SSIM)-based criterion.

11. The image processing system according to claim 10, wherein the cost function is expressed as:

Cost(INPUT, REFRENCE)=1−SSIM(Output(INPUT)+REFRENCE)+λ$_1$DownReg(INPUT)+λ$_2$WBratioReg(W,b), where INPUT represents an original image, SSIM represents structural similarity calculation function, DownReg(INPUT) represents a function for describing a similarity between the original image and a training image, λ1 represents a weight coefficient of DownReg (INPUT), λ2 represents a weight coefficient of WBratioReg(W,b), WBratioReg(W,B) represents a function for calculating a weight-to-offset ratio, and $$WBratioReg(W, b) = \frac{L1(W)}{L1(b) + eps},$$

where L1(W) represents an L1 norm of weight parameter, L1(b) represents an L1 norm of an offset parameter, and eps represents a constant.

12. A display device comprising the image processing system according to claim 1.

13. An image processing method, comprising:
performing convolution operation on an input signal, to acquire a plurality of first feature images having a first resolution;
combining the first feature images into a second feature image having a second resolution greater than the first resolution; and
performing a selection operation on the second feature image by using an activation function,
wherein in the case that a predetermined condition has been met, the second feature image or the second feature image added with an offset is outputted directly; or
in the case that the predetermined condition has not been met, the second feature image is discarded.

14. An electronic device, comprising:
one or more processors;
a memory; and
one or more programs, wherein the one or more programs are stored in the memory, and configured to be executed by the one or more processors to implement the image processing method according to claim 13.

15. A non-transitory computer-readable storage medium storing therein a computer program, wherein the computer program is executed by a processor to implement the image processing method according to claim 13.

16. The image processing system according to claim 2, wherein
the combining circuit is provided with a resolution amplification factor of M; and
the combining circuit is further configured to cross pixel values of every M first feature images, combine the every M first feature images with the crossed pixel values into M second feature images, and output the M second feature images.

17. The image processing system according to claim 16, wherein
the combining circuit is an adaptive interpolation filter.

18. The image processing system according to claim 17, wherein
the combining circuit is further configured to combine the first feature images into the second feature images using the following equation:

$$y_{p,q}^c = U^n(x_{i,j}^c) = \begin{cases} x_{i,j}^c & \text{if} \quad \begin{array}{l} i = Myp + a, \quad j = Mxq + b, \\ a = (n-1)\% \, My, \quad b = \lfloor (n-1)/My \rfloor, \end{array} \\ 0 & \text{or else} \end{cases}$$

where i is a value within a range of (0, . . . , H-1), j is a value within a range of (0, . . . , W-1), p is a value within a range of (0, MyH-1), q is a value within a range of (0, . . . , MxW-1), H represents a height of the second feature image, W represents a width of the second feature image, c represents the number of the first feature images, Mx represents an amplification factor of the first feature image relative to the second feature image in a row direction, My represents an amplification factor of the first feature image relative to the second feature image in a column direction, $\lfloor (n-1)/My \rfloor$ represents a maximum integer smaller than (n−1)/My, $x_{i,j}^c$ represents the first feature image, $y_{p,q}^c$ and $U^n(x_{i,j}^c)$ represent the second feature images, and n represents a serial number of the second feature image.

19. The image processing system according to claim 2, wherein
the combining circuit is provided with a resolution amplification factor of M; and
the combining circuit comprises:
a plurality of combining sub-circuits connected in the cascaded manner, and configured to amplify the first feature images in both a column direction and a row direction, wherein a product of amplification factors of the combining sub-circuits is equal to M; or a plurality of horizontal combining sub-circuits and a plurality of vertical combining sub-circuits, wherein the plurality of horizontal combining sub-circuits and the plurality of vertical combining sub-circuits are connected in the cascaded manner, the plurality of horizontal combining sub-circuits is configured to amplify the first feature images in the row direction, the plurality of vertical combining sub-circuits is configured to amplify the first feature images in the column direction, and a product of an amplification factor of the horizontal combining sub-circuits in the row direction and an amplification factor of the vertical combining sub-circuits in the column direction is equal to M.

20. An image processing system, comprising at least one resolution conversion sub-system, where the resolution conversion sub-system comprises a convolutional neural network (CNN) circuit, a combining circuit, an activation circuit and a conversion circuit, and the CNN circuit, the combining circuit and the activation circuit are connected in a cascaded manner, the CNN circuit is configured to perform convolution operation on an input signal, to acquire a plurality of first feature images having a first resolution, the combining circuit is configured to combine the first feature images into a second feature image having a second resolution greater than the first resolution, and the activation circuit is connected to the combining circuit, and configured to perform a selection operation on the second feature image by using an activation function, the conversion circuit is configured to convert the input image received in a red (R)-green (G)-blue (B) format into an image in a YUV format, and output a Y channel signal, a U channel signal and a V channel signal, wherein the at least one resolution conversion sub-system is configured to perform a resolution amplification on one or more of the Y channel signal, the U channel signal and the V channel signal, the image processing system is configured to amplify the resolution of the input image by an amplification factor of N;

the at least one resolution conversion sub-system is further configured to perform the resolution amplification on the Y channel signal by the amplification factor of N;

the at least one resolution conversion sub-system is further configured to perform the resolution amplification on the U channel signal by an amplification factor of N1; and the at least one resolution conversion sub-system is further configured to perform the resolution amplification on the V channel signal by an amplification factor of N2, where N1 is smaller than N, and N2 is smaller than N.

* * * * *